(12) United States Patent
Kroll

(10) Patent No.: US 12,709,174 B1
(45) Date of Patent: Aug. 18, 2026

(54) APPARATUS FOR ABOVE-GROUND POWER DISTRIBUTION AND ELECTRONIC CHARGING INFRASTRUCTURE, AND RELATED SYSTEMS AND METHODS

(71) Applicant: Amazon Technologies, Inc., Seattle, WA (US)

(72) Inventor: Kent Robert Kroll, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 971 days.

(21) Appl. No.: 17/933,402

(22) Filed: Sep. 19, 2022

Related U.S. Application Data

(60) Provisional application No. 63/311,357, filed on Feb. 17, 2022.

(51) Int. Cl.
*H02J 7/00* (2026.01)
*B60L 53/18* (2019.01)
*B60L 53/31* (2019.01)
*H02G 3/00* (2006.01)
*H02J 7/14* (2006.01)

(52) U.S. Cl.
CPC ............... *B60L 53/31* (2019.02); *B60L 53/18* (2019.02); *H02G 3/26* (2013.01)

(58) Field of Classification Search
CPC ............ B60L 53/51; B60L 53/18; H02G 3/26
USPC .......................................................... 320/132
See application file for complete search history.

(56) References Cited

U.S. PATENT DOCUMENTS 10,596,920 B2 * 3/2020 Arregui Torres ..... B60L 53/126
2011/0074351 A1 * 3/2011 Bianco .................... B60L 53/31 320/109
2013/0229141 A1 * 9/2013 Johnson ........... G06Q 10/06315 29/897.3
2015/0077239 A1 * 3/2015 Litjen ..................... B60L 53/16 320/109
2015/0195012 A1 * 7/2015 Takatsu .................... H04B 5/79 307/104
2017/0203662 A1 * 7/2017 Hiebenthal ............. B60L 53/18
2020/0384870 A1 * 12/2020 Matsui .................... B60L 53/18

(Continued)

OTHER PUBLICATIONS

"Drive Over EV Raceway"; Technical Spec Rev. C; Shoals; Mar. 2023; one page.

(Continued)

*Primary Examiner* — Alexis B Pacheco
(74) *Attorney, Agent, or Firm* — BakerHostetler

(57) ABSTRACT

A housing for an EV charging station includes a housing body having first and second ends opposite each other along a longitudinal direction. The housing body has a base that is configured to sit atop a parking surface and extends between first and second sidewalls that are opposite each other along a lateral direction perpendicular to the longitudinal direction. The housing body defines an internal volume that extends upward from the base and laterally between the sidewalls. The first and second sidewalls each have an upper portion configured to mount with a cover for substantially enclosing the internal volume along the vertical direction. The housing body includes a conduit support structure located within the internal volume and configured to support a plurality of feeder cables extending from the first end to the second end of the housing body.

20 Claims, 9 Drawing Sheets

(56) References Cited

U.S. PATENT DOCUMENTS

| | | | | |
|---|---|---|---|---|
| 2021/0178921 | A1* | 6/2021 | French | B60L 53/67 |
| 2021/0245614 | A1* | 8/2021 | Flynn | B60L 53/30 |
| 2022/0234461 | A1* | 7/2022 | Zhao | B60L 53/66 |
| 2022/0274495 | A1* | 9/2022 | Soroky | H02G 3/08 |
| 2023/0093609 | A1* | 3/2023 | Moravick | B60L 53/67 320/109 |
| 2024/0092206 | A1* | 3/2024 | Greenwell | B60L 53/31 |
| 2024/0176777 | A1* | 5/2024 | Gronowski | G01C 21/3841 |
| 2024/0198827 | A1* | 6/2024 | Vicari | B60L 53/30 |

OTHER PUBLICATIONS

"EV Power Center"; Technical Spec Rev. D; Shoals; Feb. 2023; one page.

"Electric Vehicle Raceway"; Technical Spec Rev. B; Shoals; Feb. 2023; one page.

"EMobility Solutions"; Shoals; www.shoals.com; Jan. 2, 2023; 2 pages.

"EV Big Lead Assembly (BLA)"; Technical Spec Rev. C; Shoals; Feb. 2023; one page.

"AC Level 2 Quick Connect Base"; Technical Spec Rev. B; Shoals; Feb. 2023; one page.

https://www.shoals.com/solutions/emobility/#solar-products; Shoals Technologies Group; © 2023; accessed Apr. 17, 2023; 11 pages.

* cited by examiner 100
2
2a
2b
4
6
8
10
16
18
1B
X
Y 70
66
64
60
4
60
64
66
70
34

12
14
4
14
12
34

24
74
20b
X
Y
22

24
20a
X
Y
22
72

X
Y
90,91
20c
74
75
24
85
68
90,91
150
22
72
20d 72,74
92
90,91
28,30
26
30,28
20c,20d 76
71
87
73
83
81
78
80
75
V2
77

20d
26
96
92
V
77
72
68
V2
85
74

78
20c
V
92
94
76
26

X
Y
20b
72
22
106
110
114
116
104
108
105
112
24
74
20a
102
79
118

APPARATUS FOR ABOVE-GROUND POWER DISTRIBUTION AND ELECTRONIC CHARGING INFRASTRUCTURE, AND RELATED SYSTEMS AND METHODS

CROSS-REFERENCE TO RELATED APPLICATIONS

This application claims the benefit of U.S. Provisional Patent Application Ser. No. 63/311,357, filed Feb. 17, 2022, in the name of Kroll, the entire disclosure of which is hereby incorporated by reference into this patent application.

TECHNICAL FIELD

The present invention relates to electronic charging infrastructure, and more particularly, to apparatuses that provide combined power distribution and barrier protection for above-ground electric vehicle (EV) charging infrastructure.

BACKGROUND

Electric Vehicle (EV) charging infrastructure requires significant material and labor investment due to the required underground power distribution and construction necessary. Most new EV charging locations are expected to utilize existing parking lots. Typical EV charging units require full excavation/demolition of the existing concrete/asphalt, installation of conduits, pour back for asphalt, new concrete curbs for chargers and protective bollards around the charger itself. This results in high costs due to the number of trades and duration it takes to implement.

Other EV charging unit options use expensive bus-ducts or steel gantry systems, both of which are financially prohibitive in most applications and still require additional mounting and protection. Moreover, these options are not designed for installation mobility.

For these and other reasons, what is needed for EV charging units are design features that reduce infrastructure costs while providing installation mobility such that the charging units can be relocated to a new site once the lease is over.

BRIEF DESCRIPTION OF THE DRAWINGS

The foregoing summary, as well as the following detailed description of illustrative embodiments of the present application, will be better understood when read in conjunction with the appended drawings. For the purposes of illustrating the features of the present application, there is shown in the drawings illustrative embodiments. It should be understood, however, that the application is not limited to the precise arrangements and instrumentalities shown. In the drawings.

DETAILED DESCRIPTION OF ILLUSTRATIVE EMBODIMENTS

Figures 1A, 1B:
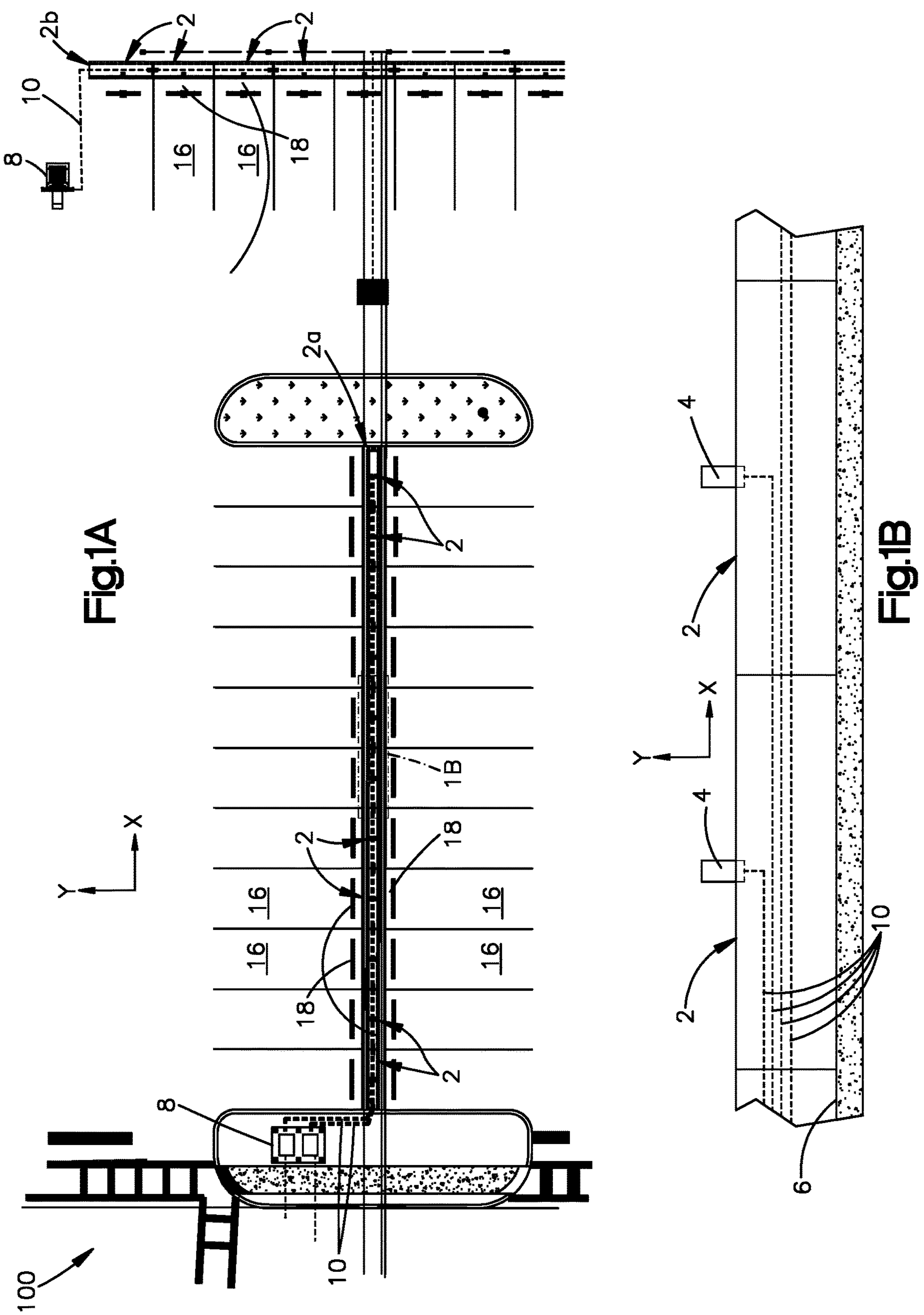
FIG. 1A is a plan view of an EV charging system that employs a plurality of interconnected modular charging units, according to an embodiment of the present disclosure.
FIG. 1B is an elevation view of some of the interconnected modular charging units illustrated in FIG. 1A.

The present disclosure can be understood more readily by reference to the following detailed description taken in connection with the accompanying figures and examples, which form a part of this disclosure. It is to be understood that this disclosure is not limited to the specific devices, methods, applications, conditions or parameters described and/or shown herein, and that the terminology used herein is for the purpose of describing particular embodiments by way of example only and is not intended to be limiting of the scope of the present disclosure. Also, as used in the specification including the appended claims, the singular forms “a,” “an,” and “the” include the plural, and reference to a particular numerical value includes at least that particular value, unless the context clearly dictates otherwise.

The term “plurality”, as used herein, means more than one. When a range of values is expressed, another embodiment includes from the one particular value and/or to the other particular value. Similarly, when values are expressed as approximations, by use of the antecedent “about,” it will be understood that the particular value forms another embodiment. All ranges are inclusive and combinable.

The terms “approximately”, “about”, and “substantially”, as used herein with respect to dimensions, angles, ratios, and other geometries, takes into account manufacturing tolerances. Further, the terms “approximately”, “about”, and “substantially” can include 10% greater than or less than the stated dimension, ratio, or angle. Further, the terms “approximately”, “about”, and “substantially” can equally apply to the specific value stated.

It should be understood that, although the terms first, second, etc. may be used herein to describe various elements, these elements should not be limited by these terms. These terms are instead used to distinguish one element from another. For example, a first element could be termed a second element, and, similarly, a second element could be termed a first element without departing from the scope of the embodiments disclosed herein.

The embodiments disclosed herein pertain to apparatuses that provide combined power distribution and barrier protection for above-ground electric vehicle (EV) charging infrastructure. The apparatuses herein can be prefabricated as individual, modular charging sections or units that can be connected together on-site and above-ground in an EV charging area. One example of such an EV charging area is a parking lot. The modular design of the charging units described herein facilitates connecting high quantities of prefabricated charging units together on-site and above-ground, such as atop the parking surface in an existing parking lot, as needed based on the desired number of charging units at the charging site. Embodiments of such charging units as described herein solve many of the problems associated with EV charging site construction. For example, the charging units described herein significantly reduce construction costs by prefabricating the power conduit distribution, the EV charger, and the protective barrier as a combined solution in a single, modular unit. Furthermore, the charging units can be delivered in large quantities and coupled together above-ground in a high-volume EV charging lot in a fraction of the time than that required for traditional high-volume EV charging sites. Additionally, because the charging units can be installed above-ground, the need for digging, trenching, or otherwise reconstructing portions of the parking surface can be avoided, thereby further reducing construction costs.

Referring now to FIGS. 1A-1B, an exemplary EV charging system 100 is shown that employs a plurality of interconnected charging units 2 that provide combined power distribution and barrier protection for respective chargers 4 of the charging units 2. As illustrated, the charging units 2 are arranged in groupings or series in which the charging units 2 are connected end-to-end with each other along a longitudinal direction X. The charging units 2 are configured to be disposed above-ground atop a parking surface 6, which can be paved or unpaved (i.e., gravel, concrete, grass, dirt, or other earthwork). The charging units 2 are in electrical communication with one or more power sources 8, such as substations, transformers, generators, and the like, that supply power to the chargers 4 via conduits, such as power supply cables 10 (also referred to herein as "feeder cables" 10), that extend through interior volumes of the charging units 2, as described in more detail below. Because the feeder cables 10 extend through the interior volumes of the charging units 2, the power infrastructure of the charging system 100 can be entirely above-ground, eliminating the need for buried or trenched conduit. However, the charging units 2 of the illustrated embodiments have access openings allowing for optional connection with buried conduit, as described in more detail below.

In the illustrated example, the charging units 2 are arranged in one or more charging unit series 2*a*, 2*b* that extend along an associated series of parking stalls 16 such that the charging units 2 are transverse to inner ends 18 of the parking stalls 16. To increase spatial efficiency, the charging units 2 are preferably disposed between opposed inner ends of parking stalls 16 that are located opposite each other along a lateral direction Y that is perpendicular to the longitudinal direction X, as shown in the charging unit series 2*a* illustrated in FIG. 1A. As used herein, the terms "longitudinal", "longitudinally", and derivatives thereof refer to the longitudinal direction X, and the terms "lateral", "laterally", and derivatives thereof refer to the lateral direction Y. The modular design of the charging units 2 provides significant flexibility in the manner in which they can be arranged and grouped together. One area in which such flexibility is particularly advantageous is when retrofitting an existing parking lot with an EV charging system 100. It should also be appreciated that, although the charging units 2 are configured for above-ground installation, the charging units 2 can optionally be disposed within a recess or trench such that a portion of the charging units 2 are positioned below the parking surface 6.

Figure 2A:
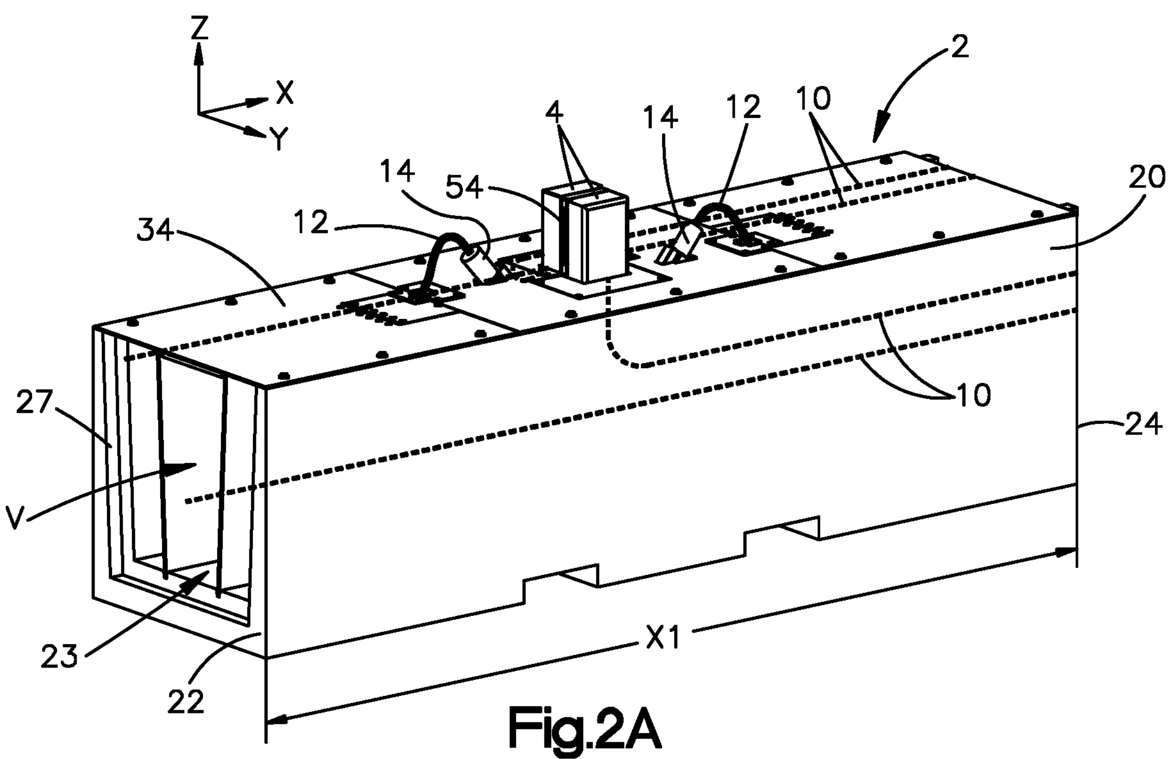
FIGS. 2A and 2B are different perspective views of one of the modular charging units illustrated in FIG. 1A, according to an embodiment of the present disclosure.
Figure 2B:
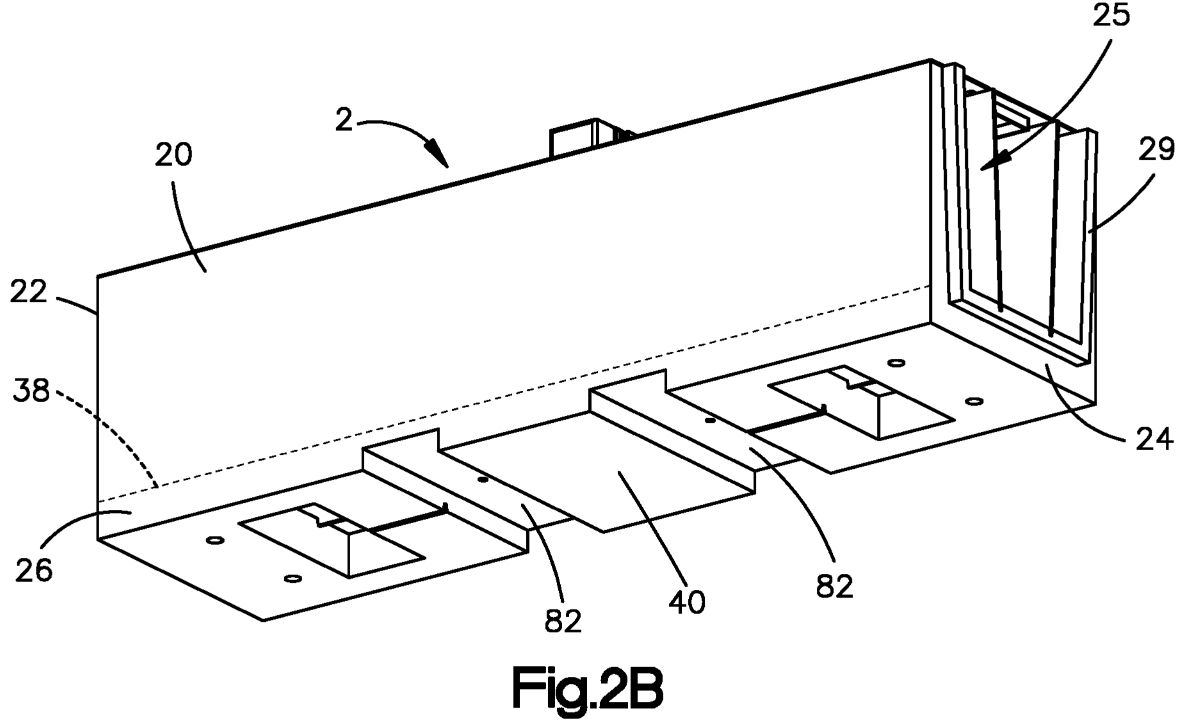

Referring now to FIGS. 2A-2B, an exemplary charging unit 2 is shown that provides combined power distribution and barrier protection for one or more chargers 4. Accordingly, each charging unit 2 can also be referred to as a "protective charging station." The charging unit 2 includes a housing body 20 having an internal volume V, one or more chargers 4 connected to the housing body 20, one or more feeder cables 10 housed within the internal volume V, one or more charge cables 12 that extend from the one or more chargers 4 to one or more respective charge heads 14, and a cover 34 configured to secure the charger(s) 4, feeder cable(s) 10, charge cable(s) 12, and charge head(s) 14, and any additional internal components housed within the internal volume V of the housing body 20 against theft and/or damage.

The housing body 20 is preferably a monolithic body comprising concrete formed around rebar and/or other reinforcement structures, such as reinforced mesh(es), which construction facilitates efficient, cost-effective, and scalable prefabrication. In additional embodiments, the housing body 20 need not be monolithic and can instead include two or more body pieces fitted, coupled, or otherwise attached together. Preferably, the concrete consists of CarbonCure Concrete mix, in which captured carbon from oil & gas stacks is permanently trapped it into the concrete. Using such construction, each housing body 20 includes about 100 lbs of captured carbon. Thus, such housing bodies 20 provide significant environmental advantages. In other embodiments, other concrete mixes and constituent materials can be employed.

Figure 2C:
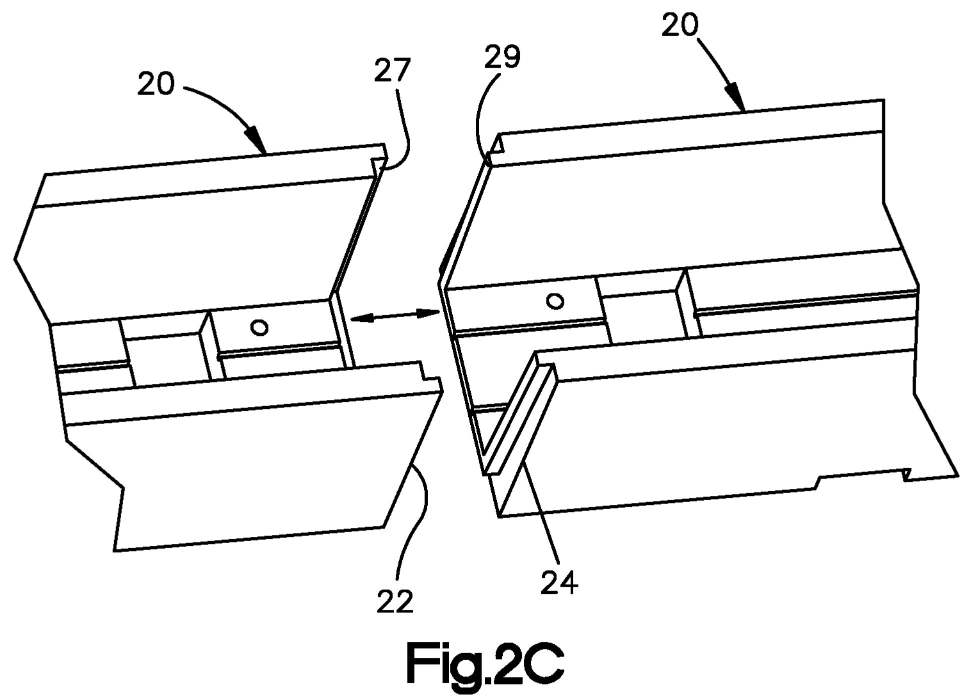
FIG. 2C is a perspective view of complimentary mating features of the modular charging units illustrated in FIGS. 2A and 2B, according to an embodiment of the present disclosure.

The housing body 20 is elongate along the longitudinal direction X and has first and second ends 22, 24 that are longitudinally spaced from each other. The housing body 20 illustrated in FIGS. 2A-2D is an intermediate-type housing body 20 configured to connect to adjacent housing bodies 20 at both of the first and second ends 22, 24. Thus, the depicted housing body 20 defines respective openings 23, 25 at the first and second ends 22, 24 that are in communication with the internal volume V. It should also be appreciated, however, that the EV charging system 100 can employ housing bodies having one or more variant configurations, such as closed- or capped-end configurations, as described in more detail below. In the present embodiment, the first end 22 has a first mating structure 27 and the second end 24 has a second mating structure 29 that are configured to mate with each other. In this manner, as shown in FIG. 2C, the first mating structure 27 of one housing body 20 is configured to mate with the second mating structure 29 of an adjacent housing body 20, and so forth such that successive housing bodies 20 can be connected to the series 2*a*, 2*b*. In some embodiments, the first mating structure 27 can be one of a male-type or female-type structure and the second mating structure 29 can be the other of the male-type or female-type structure. For example, in the illustrated embodiments, the second and first mating structures 29, 27 are tongue (male) and groove (female) mating structures, respectively. It should be appreciated, however, that other mating structures and structure types are within the scope of the present disclosure.

Figure 3A:
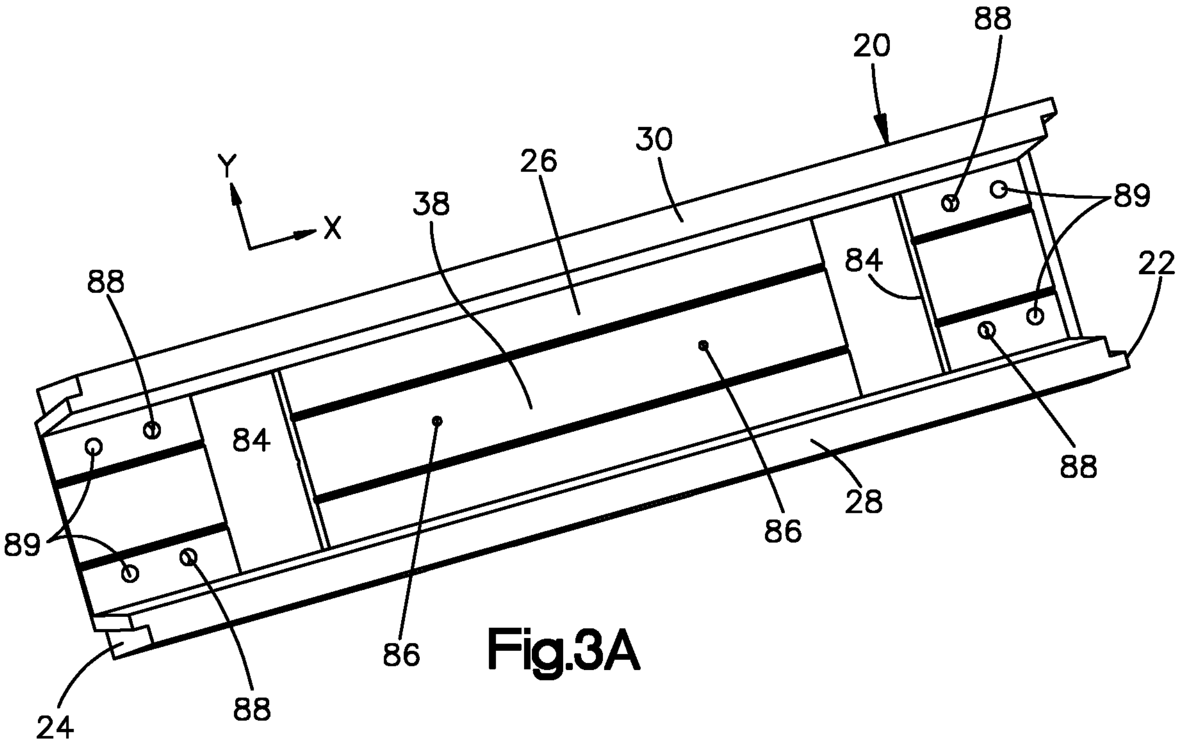
FIG. 3A is top perspective view of a housing body of the modular charging unit illustrated in FIG. 2A.
Figures 3B, 3C:
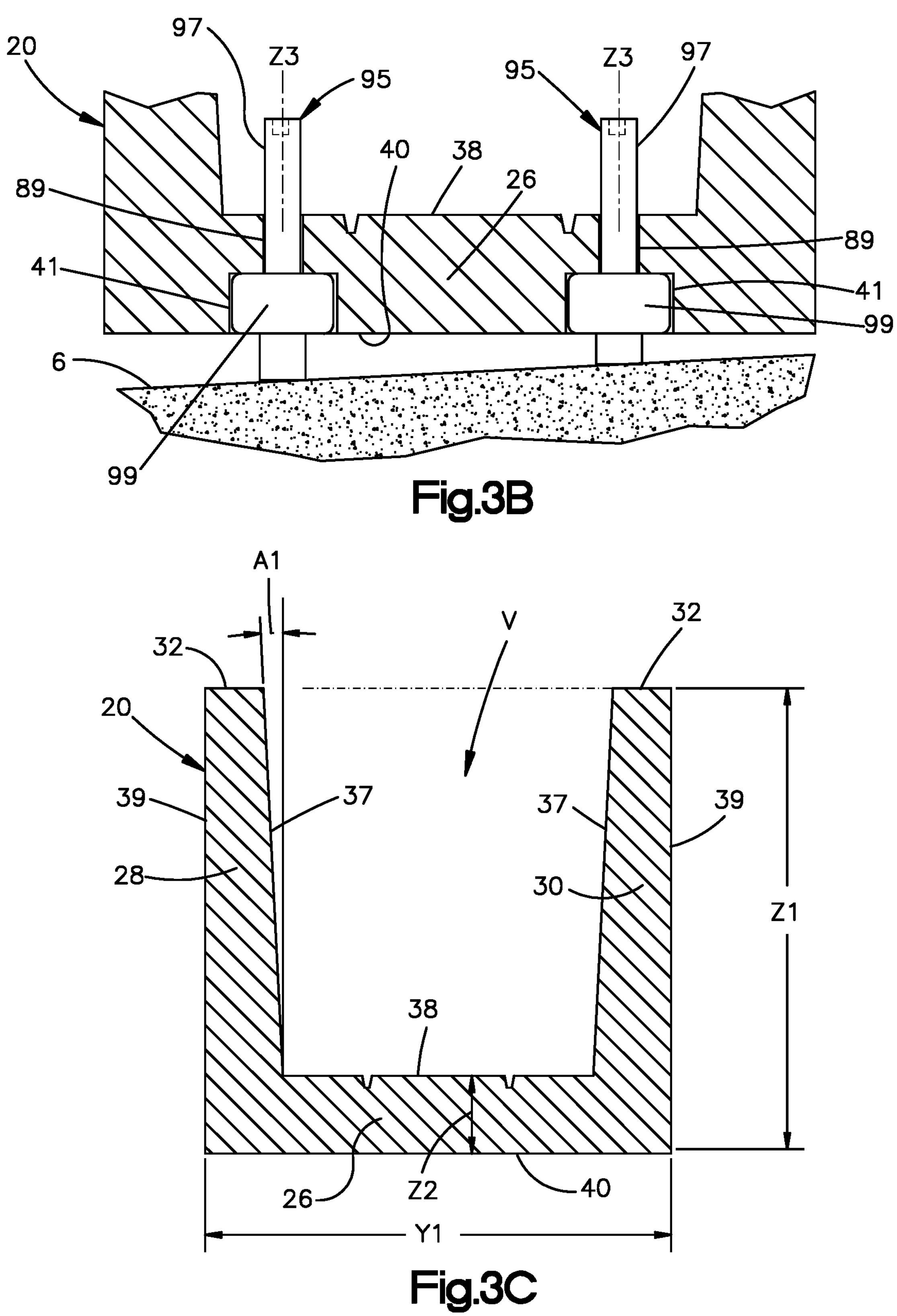
FIGS. 3B and 3C are sectional end views of the housing body illustrated in FIG. 3A.

Referring now to FIGS. 2B and 3A-3B, the housing body 20 includes a base 26 that extends between first and second sidewalls 28, 30 positioned opposite each other along the lateral direction Y. The base 26 includes a floor surface 38 that partially defines the interior volume V. The base 26 also includes a bottom surface 40 opposite the floor surface 38 along a vertical direction Z that is perpendicular to the longitudinal and lateral directions X, Y. The bottom surface 40 is configured to sit atop the parking surface 6. The first and second sidewalls 28, 30 extend upward from the base 26 along the vertical direction Z to respective sidewall upper ends 32. As used herein, the terms "vertical", "vertically", upward, downward, and derivatives thereof refer to the vertical direction Z. The internal volume V of the housing body 20 extends upward from the base 26 to the cover 34 and extends laterally between interior surfaces 37 of the sidewalls 28, 30.

As shown in FIGS. 2B and 3A, the underside of the base 26 preferably includes features configured to facilitate moving and installing the charging unit 2. For example, the base 26 preferably includes lateral slots 82 recessed upwardly from the bottom surface 40 and configured to receive complimentary lifting structures of a lifting device, such as tines of a forklift and/or tines of a crane-hoisted pallet fork. The lateral slots 82 thus facilitate rapid loading, unloading, and positioning of the charging units 2 via various lifting devices.

The base 26 also preferably defines one or more openings that provide access between the interior volume V and an exterior of the housing body 20 for various purposes. For example, in the illustrated embodiment, the base 26 defines a pair of bottom access openings 84 that are configured for providing underground access to the interior volume V, such as for entry and/or exit of buried or underground conduit into and/or out of the internal volume V. As shown, the bottom access openings 84 can extend laterally from one sidewall 28 to the other sidewall 32. It should be appreciated that the bottom access openings 84 can also facilitate drainage of fluid from the interior volume V. The base 26 can also define one or more additional drainage openings 86, which can be remote from the bottom access openings 84.

The base 26 can further define yet additional openings 88, such as for coupling with anchor members, such as earth screws, for anchoring the housing body 20 to the parking surface 6. Additionally or alternatively, the base 26 preferably defines leveling openings 89 or other formations configured to receive leveling inserts 95 that are mountable to the housing body 20 and are individually height adjustable, thereby leveling the position of the charging unit 2. As shown in FIG. 3B, the leveling inserts 95 can include a threaded shaft 97 that is extendable through the opening 89 and a nut 99 positioned on an underside of the base 26. In the illustrated embodiment, the nut 99 resides in a receptacle 41 defined in an underside of the base 26. Each shaft 97 is rotatable about respective shaft axis Z3 to adjust its vertical position relative to the associated nut 99 along the shaft axis Z3, thereby providing individual leveling adjustments of the housing body 20 with respect to the parking surface 6. The shafts 97 can be rotatably driven by a driving instrument, such as a powered driver, which can mate with an attachment formation of the shaft 97, such as a socket at the proximal end thereof, by way of a non-limiting example. To increase leveling precision and stability, the leveling openings 89 are preferably located adjacent the longitudinal and lateral corners of the base 26. It should be appreciated that if anchor members and/or leveling inserts are not coupled within the openings 88 and leveling openings 89, such opening can alternatively be employed for drainage and/or for providing access for one or more additional conduits, such as PVC conduits, into and/or out of the interior volume V. It should further be appreciated that various additional and/or alternative access openings can also be defined by the base 26.

The housing body 20 is configured to provide a high-strength protective barrier for the components housed within the interior volume V. This strength is provided, at least in part, by the geometry, dimensions, and concrete composition of the housing body 20. For example, as shown in FIG. 2A, the housing body 20 defines a length X1, as measured between the first and second ends 22, 24, which can be in a range of about 6.0 feet to about 14.0 feet, and more particularly in a range of about 8.0 feet to about 12.5 feet, and preferably in a range of about 10.5 feet to about 11.5 feet. These ranges for the length X1 generally correspond to the width of common parking stalls 16 and thus can also facilitate useful estimates for the quantity of charging units 2 necessary to service a known quantity of EV parking stalls 16.

Referring now to FIG. 3C, the housing body 20 also defines an outer width Y1, as measured between exterior surfaces of the sidewalls 22, 24, which can be in a range of about 1.8 feet to about 6.0 feet, and more particularly in a range of about 2.2 feet to about 4.0 feet, and preferably in a range of about 2.8 feet to about 3.2 feet. These ranges for the outer width X1 generally allow the housing body 20 to be installed between most inwardly opposed parking stalls, such as those serviced by charging unit series 2*a* shown in FIG. 1A).

The first and second sidewalls 28, 30 define respective sidewall thicknesses Y2, as measured along the lateral direction Y. In the illustrated embodiment, the sidewalls 28, 30 have substantially equivalent sidewall thicknesses Y2, thereby facilitating the sidewalls 28, 30 having substantially equivalent strengths (e.g., lateral impact strengths). The sidewall thicknesses Y2 can be in a range of about 2.5 inches to about 10.0 inches, and more particularly within a range of about 3.5 inches to about 8.0 inches, and more particularly in a range of about 4.0 inches to about 6.5 inches. Additionally, the interior surfaces 37 of the sidewalls 28, 30 are preferably canted (e.g., tapered) laterally outward at a relief angle A1 as they extend from the floor surface 38 to their sidewall upper ends 32. The relief angle A1 can be in a range of about 0.2 degrees to about 15.0 degrees, and more particularly in a range of about 0.5 degrees to about 7.5 degrees, and more particularly in a range of about 1.0 degrees to about 3.5 degrees. Among other benefits, such angled or tapered orientations of the interior surfaces 37 reduce stress concentrations within the housing body 20 and thereby increase the strength thereof. The tapered or angled orientations also facilitate better fluid drainage from within the interior volume V, such as during extreme weather events. In one non-limiting example embodiment of a housing body 20 having sidewalls 28, 30 with tapered inner surfaces 37, the sidewalls 28, 30 have a minimum sidewall thickness of at least 4.0 inches.

The housing body 20 also defines a height Z1, as measured vertically between the bottom surface 40 and the sidewall upper ends 32. The height Z1 can be in a range of about 2.0 feet to about 5.0 feet, and more particularly in a range of about 2.5 feet to about 4.0 feet, and preferably in a range of about 2.8 feet to about 3.2 feet. The base 26 also defines a base height Z2, as measured vertically between the bottom surface 40 and the floor surface 38. The base height Z2 can be in a range of about 2.5 inches to about 10.0 inches, and more particularly within a range of about 3.5 inches to about 8.0 inches, and more particularly in a range of about 4.0 inches to about 6.5 inches.

The foregoing features of the housing body 20 allow the first and second sidewalls 28, 30 to protect the electrical components of the charging unit 2, particularly against vehicle impacts, thereby obviating the need for installing protective bollards alongside the charging unit 2. It should be appreciated that housing body 20 has an impact strength at least sufficient to satisfy the standards for low-speed impact ratings in compliance with ASTM F3016-19 (based on surrogate test vehicle weighing 5,000 lbs), including penetration/speed ratings of P1/S10 (penetration P1 of less than or equal to 1 ft, as measured from the leading surface of the housing body at the point of impact, at a speed S10 of 10 mph), P2/S20 (penetration P2 from 1-4 ft at a speed S20 of 20 mph); and P3/S30 (penetration less than 4 ft at a speed S30 of 30 mph). Additionally or alternatively, the housing body 20 has an impact strength that can satisfy standards for high-speed impact ratings in compliance with ASTM F2656-19.

Figure 4:
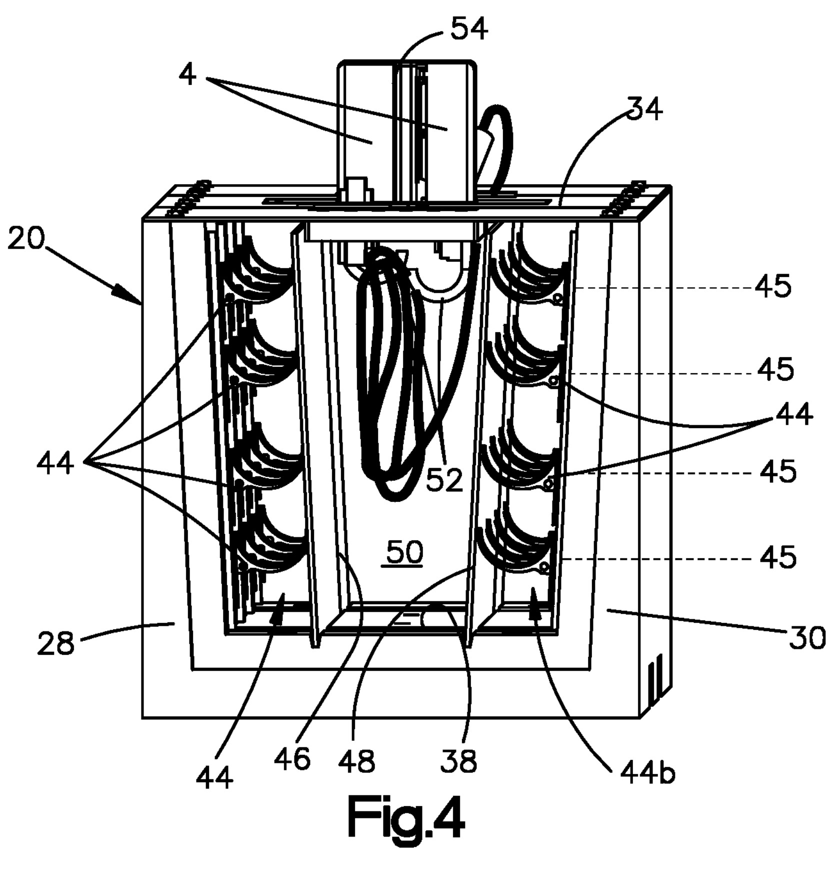
FIG. 4 is an end perspective view of the modular charging unit illustrated in FIGS. 2A and 2B.

Referring now to FIG. 4, the internal volume V is configured to house feeder cables 10 that supply the charger(s) 4 of the charging unit 2 and also one or more additional feeder cables 10 that supply power to chargers 4 of downstream charging units 2 in the series 2*a*, 2*b*. Preferably, each charger 4 is supplied by an individual feeder cable 10 extending from the power source 8, such that the chargers 4 are connected in parallel. In this manner, each series 2*a*, 2*b* of interconnected charging units 2 has an advantageous multiple-loop feeder design that can isolate and compartmentalize electrical failures within the system 100 and significantly increases the speed at which damaged and/or faulty electrical components can be identified, repaired, and/or replaced. This multiple-loop feeder design also avoids the drawbacks of a single-loop feeder design, such as instances in which a short in the feeder loop affects all downstream chargers. It should therefore be appreciated that, for a charging unit series 2*a*, 2*b* having a high quantity of interconnected charging units 2, the proximal charging units 2 benefit by having ample storage space within the internal volume V for housing high quantities of feeder cables 10.

For these reasons, the charging unit 2 includes a conduit support structure 42 within the internal volume V. In the illustrated embodiment, the conduit support structure 42 includes a plurality of racks 44 each configured to support one or more feeder cables 10. The racks 44 extend inwardly from the interior surface 37 of at least one of the sidewalls 28, 30. As shown, the plurality of racks 44 can have a “double-sided” arrangement that includes a first set 44*a* of racks 44 mounted to the interior surface 37 of the first sidewall 28 and a second set 44*b* of racks 44 mounted to the interior surface 37 of the second sidewall 30. The first and second sets 44*a*, 44*b* of racks 44 can each be arranged in rows 45 vertically spaced from each other. Additionally, each of the rows 45 is preferably elevated above the floor surface 38, thereby reducing the likelihood of the feeder cables 10 contacting water or debris that might find its way into the interior volume V. The double-sided rack arrangement of the illustrated embodiment provides for organized disposition of the feeder cables 10 along the charging unit 2.

As shown, the charging unit 2 can also include first and second dividers 46, 48 that are located within the internal volume V between interior ends of the first and second sets of racks 44. The first and second dividers 46, 48 extend longitudinally between the first and second ends 22, 24 and also extend substantially vertically between the floor surface 38 and the cover 34. The first and second dividers 46, 48 are laterally spaced from each other, thereby defining a compartment 50 therebetween. The compartment 50 is configured to house the portions of the feeder cable(s) 10 that connect with the charger(s) 4. The compartment 50 is also configured to house at least portions of the charge cable(s) 12 and charge head(s) 14 that extend from the charger(s) 4 for docking with a charge port of an EV. As shown, the cover 34 can include one or more cable support hooks 52 that extend within the compartment 50 and are configured to support one or more charge cables 12. In this manner, at least the majority of each charge cable 12 can remain within the compartment 50 (and thus within the interior volume V) between uses, reducing the chances that the charge cable(s) 12 becomes stolen or damaged. The cable support hooks 52 are also configured to facilitate organized storage of the charge cable(s) 12, thereby reducing the chances that the charge cable(s) 12 become tied, knotted, or otherwise disorganized between uses.

Figure 5A:
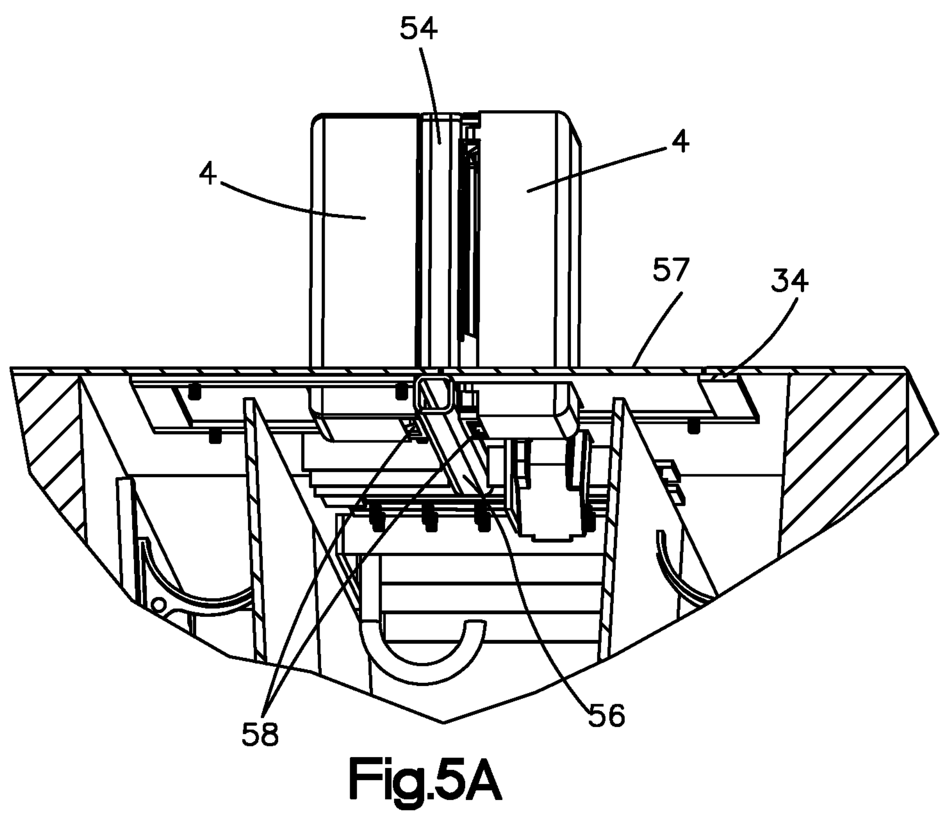
FIG. 5A is a perspective, sectional view of a cover member and mounted chargers of the modular charging unit illustrated in FIGS. 2A and 2B.
Figures 5B, 5C:
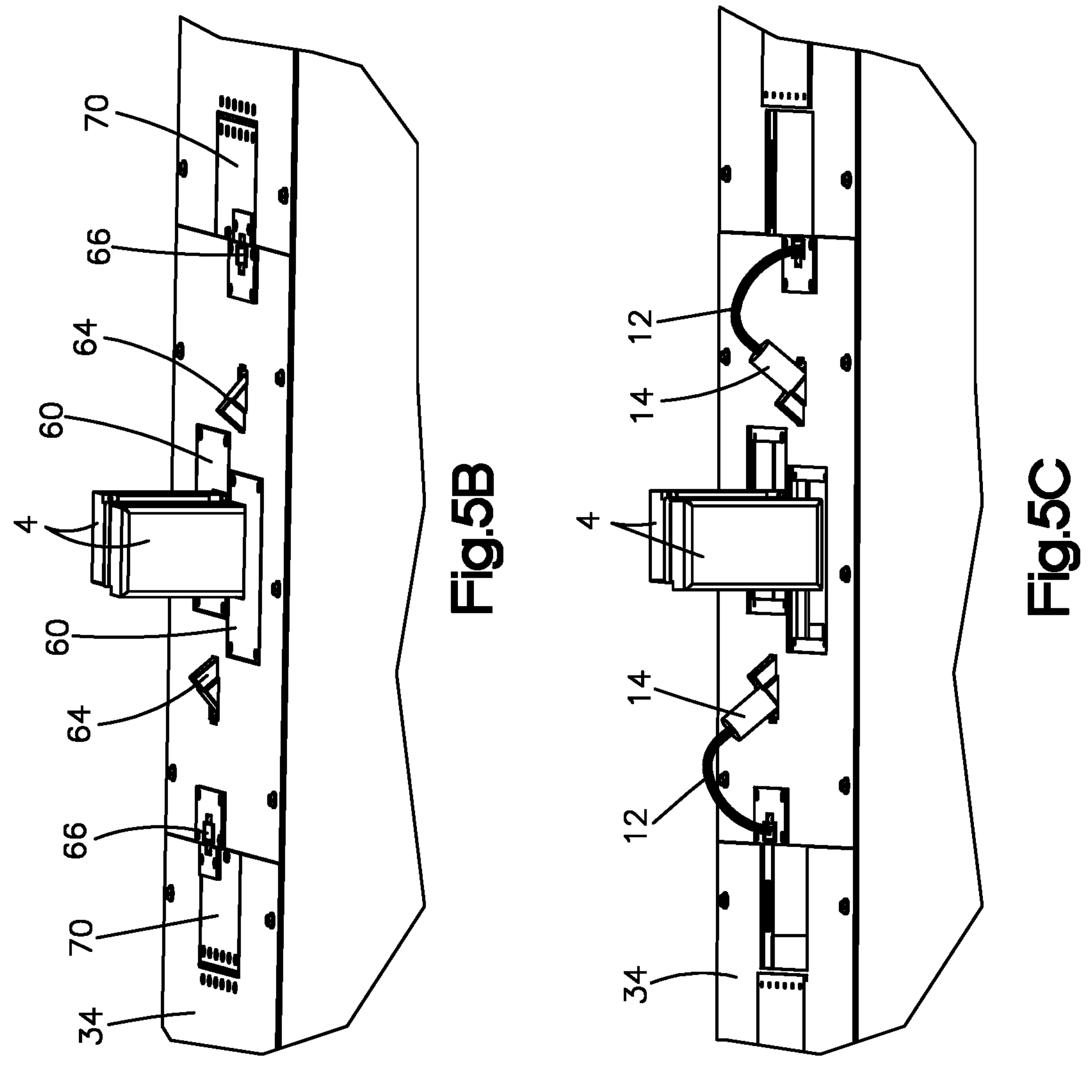
FIGS. 5B and 5C are perspective views of the cover member showing access panels in respective closed configurations (FIG. 5B) and respective open configurations (FIG. 5C)

Referring now to FIGS. 5A-5C, the cover 34 is configured to facilitate easy yet secured use of the charge cable(s) 12 while also protecting and securing the electrical components of the charging unit 2 against theft, vandalism, debris, weather, and other environmental factors, by way of non-limiting examples. The cover 34 of the illustrated embodiment is yet further configured to mount with the charger(s) 4 while also providing secured access to the charger(s) 4, such as for repair and replacement, by way of non-limiting examples. The cover 34 is located opposite the base 26 along the vertical direction Z. In the illustrated embodiment, the cover 34 is mounted to the sidewall upper ends 32. However, in other embodiments, the cover 34 can be mounted to other structure of the housing body 20, such as shoulders, landings, or mounting bosses defined on interior portions of the first and second sidewalls 28, 30, by way of non-limiting examples.

In the illustrated embodiment, the charging unit 2 includes a charger mounting post 54 that extends upward from the cover 34 and is configured for mounting a pair of chargers 4 thereto. The chargers 4 of the illustrated embodiment are alternating current (AC), Level 2, commercial VersiCharge™ chargers produced by Siemens AG of Munich, Germany. It should be appreciated that the charging units 2 can be configured to carry various other types of chargers 4, such as Level 1 chargers and/or 50-kW DC fast chargers, by way of non-limiting examples. For larger chargers 4, such as 50-kW DC fast chargers, the chargers 4 can be mounted to the base 26 of the housing body 20, for example. In such embodiments, upper portions of the charger 4 can optionally extend upwardly through an opening in the cover 34.

With continued reference to FIGS. 5A-5C, the cover 34 includes a secured mount formation 56 that is recessed beneath a top surface 57 of the cover 34 and is configured to engage complimentary mount portions 58 of the associated chargers 4. The cover 34 includes one or more charger access panels 60 that are adjacent the secured mount formation 56 and are removable or otherwise openable for accessing the secured mount formation 56, such as for inspecting, connecting, and/or disconnecting the mount portion 58 of an associated charger 4. The one or more charger access panels 60 have locking mechanisms, such as screws, bolts, or other lockable connectors that allow the charger access panel(s) 60 to iterate between a closed, locked position, in which access to the secured mount formation 56 through the cover 34 is denied, and an unlocked, open position, in which access to the secured mount formation 56 through the cover 34 is provided. In the illustrated embodiment, the cover 34 includes a pair of charge access panels 60, which are each located adjacent a respective one of the pair of chargers 4 and are each individually iteratable between their closed, locked position and unlocked, open position, such that each charger access panel 60 only provides access to the mount portion 58 of the associated charger 4 of the pair of chargers 4. It should be appreciated that other charger access panel configurations are within the scope of the present disclosure.

The cover 34 is also preferably configured to facilitate easy yet secure use of the charge cable(s) 12 and charge head(s) 14 during EV changing. For example, the cover 34 can include one or more receptacles 64, such as one or more holsters 64, into which the charge head(s) can partially reside between uses. Additionally, the cover 34 includes one or more cable ports 66 configured to facilitate egress and ingress of the charge cable from and into the compartment 50 during use. In this manner, one or more charge cables 14 are iteratable between a neutral configuration, in which at least a majority of each respective charge cable 14 is disposed underneath the cover 34 and within the internal volume V (e.g., within the compartment 50), and an active configuration, in which a portion of the at least the majority of respective charge cable 14 extends outside the internal volume V. Preferably, the cover 34 includes one or more cable translation devices, such as rollers, that facilitate smooth cable egress and ingress through the cable port(s) 66 between the neutral and active configurations. In additional embodiments, the charging unit 2 can include one or more retraction mechanisms, such as a biased spool or the like, configured to apply a tensile retraction force to the charge cable(s) 14 after use for automatically returning the charge cable(s) 12 to the neutral configuration after use. It should be appreciated that the one or more cable ports 66 have an opening size that preferably provides a close clearance, particularly a clearance that is sufficient for smooth cable ingress and egress yet insufficient for inserting a tool or other unwanted device through the cable port 66 while the charge cable 12 extends therethrough. In this manner, the cable port(s) 66 are preferably configured to inhibit attempts to use them for tampering or otherwise gaining unapproved access to the interior volume V (or the compartment 50 therein).

The cover 34 of the illustrated embodiment also includes one or more cable access panels 70 that are adjacent the one or more cable ports 66 and are removable or otherwise openable for accessing compartment 50, such as for inspecting, repairing, replacing, or otherwise servicing the charge cable(s) 12, by way of non-limiting examples. The one or more cable access panels 70 preferably have locking mechanisms, such as keylocks, screws, bolts, or other lockable connectors, that allow the cable access panel(s) 70 to iterate between a closed, locked position (FIG. 5B), in which access to the charge cable(s) 12 through the cover 34 is denied, and an unlocked, open position (FIG. 5C), in which access to the charge cable(s) 12 through the cover 34 is provided. In the illustrated embodiment, the cover 34 includes a pair of cable access panels 70, which are each located adjacent a respective one of the cable ports 66 and are each individually iteratable between their closed, locked configuration and their unlocked, open position. It should be appreciated that other cable access panel configurations are within the scope of the present disclosure.

It should be appreciated that the various dimensions and other parameters of the charging units 2 and their constituent components described above are provided as exemplary features, which can be adjusted as needed without departing from the scope of the present disclosure. For example, as discussed below with reference to FIGS. 6A-6B, examples of housing body variants include end-type housing bodies having enclosed ends, such as for providing an end-unit in a series of charging units 2. Additionally, as discussed below with reference to FIGS. 7A-8B, additional examples of housing body variants include adapter-type housing bodies that are configured to connect with additional components of an EV charging system, such as a walkway bridge (FIGS. 7A-7D) or a light-pole fixture (FIGS. 8A-8B), by way of non-limiting examples.

Figures 6A, 6B, 7A:
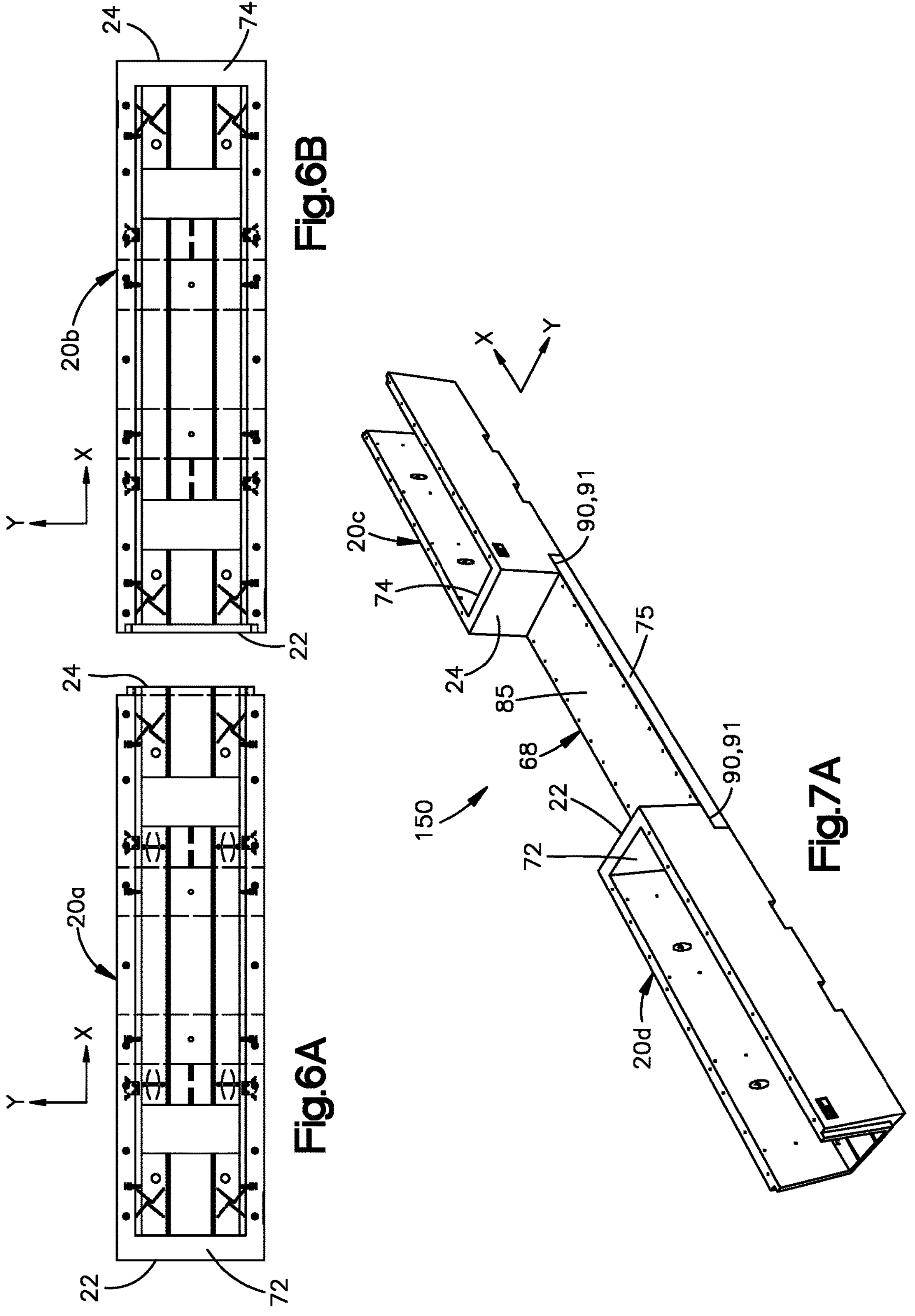
FIGS. 6A and 6B are top views of enclosed-end housing bodies for variants of the modular charge units.
FIG. 7A is a perspective view of a bridge assembly of an EV charging system, in which the bridge assembly includes additional variants of end-type housing bodies, according to an embodiment of the present disclosure.

Referring now to FIGS. 6A-6B, variants of the housing body configurations include end-type configurations, such as when the housing body 20 is configured to be a proximal end unit or a distal end unit of the charging unit series 2*a*, 2*b*. In such end-type configurations, an end-type housing body 20*a*, 20*b* is configured such that the first or second end 22, 24 is preferably enclosed or capped by a respective first or second end member 72, 74. In this manner, the first and/or second end members 72, 74 can provide the charging unit 2 with a protective end barrier that secures the respective end 22, 24 of the housing body 20 and thereby also secures the respective end of the charging unit series 2*a*, 2*b*. In this embodiment, housing body 20*a* is a proximal end-type housing body 20*a* in which the first end 22 has first end member 72; and housing body 20*b* is a distal end-type housing body 20*b* in which the second end 24 has second end member 74. As shown, the end members 72, 74 can be monolithic with the remainder of the respective housing body 20. In other embodiments, the first or second end members 72, 74 can be a cap member insertable within the respective first or second opening 23, 25 (see the openings 23, 25 shown in FIGS. 2A-2B). It should be appreciated that the first and/or second end member 72, 74 can define one or more ports or apertures for providing access, such as for conduit or other components, between the internal volume V of the respective end charging unit 2 and the exterior thereof.

Referring now to FIGS. 7A-7D, additional example variant housing body configurations include adapter-type configurations for connection to additional components of an EV charging system 100. In this example embodiment, the additional component is a walkway bridge 68 interconnecting a pair of adapter-type housing bodies 20*c*, 20*d*. The walkway bridge 68 and the adapter-type housing bodies 20*c*, 20*d* are employed as part of a bridge assembly 150. The walkway bridge 68 is configured to allow foot-traffic laterally across the charging unit series 2*a*, 2*b* without requiring disruption of the power distribution (e.g., feeder cables 10) along the charging unit series 2*a*, 2*b*.

In particular, the walkway bridge 68 has a bridge housing body 75 that extends longitudinally between opposed first and second ends 76, 77. The bridge housing body 75 includes a bottom portion or bridge base 78 that extends laterally between a pair or sidewalls 80, 81. The bridge housing body 75 defines an interior passage or volume V2 that extends laterally between the sidewalls 80, 81 and upward from a bridge floor surface 83. The bridge housing body 75 is preferably monolithic, as shown, although in other embodiments the bridge housing body 75 can include two or more parts coupled together. The first and second ends 76, 77 of the bridge housing body 75 are open along the longitudinal direction for providing open communication with the interior volumes V of the adjacent housing bodies 20*c*, 20*d*. The bridge housing body 75 also preferably includes features for drainage, such as a longitudinally elongate drainage channel 71 and one or more drainage holes 73 that extends downward from the channel 71 and through the bridge base 78. It should be appreciated that the bridge housing body 75 can employ additional and/or alternative features, such as for drainage, anchoring to the parking surface (or ground), and/or access to buried conduit, by way of non-limiting examples.

Figures 7B, 7C, 7D:
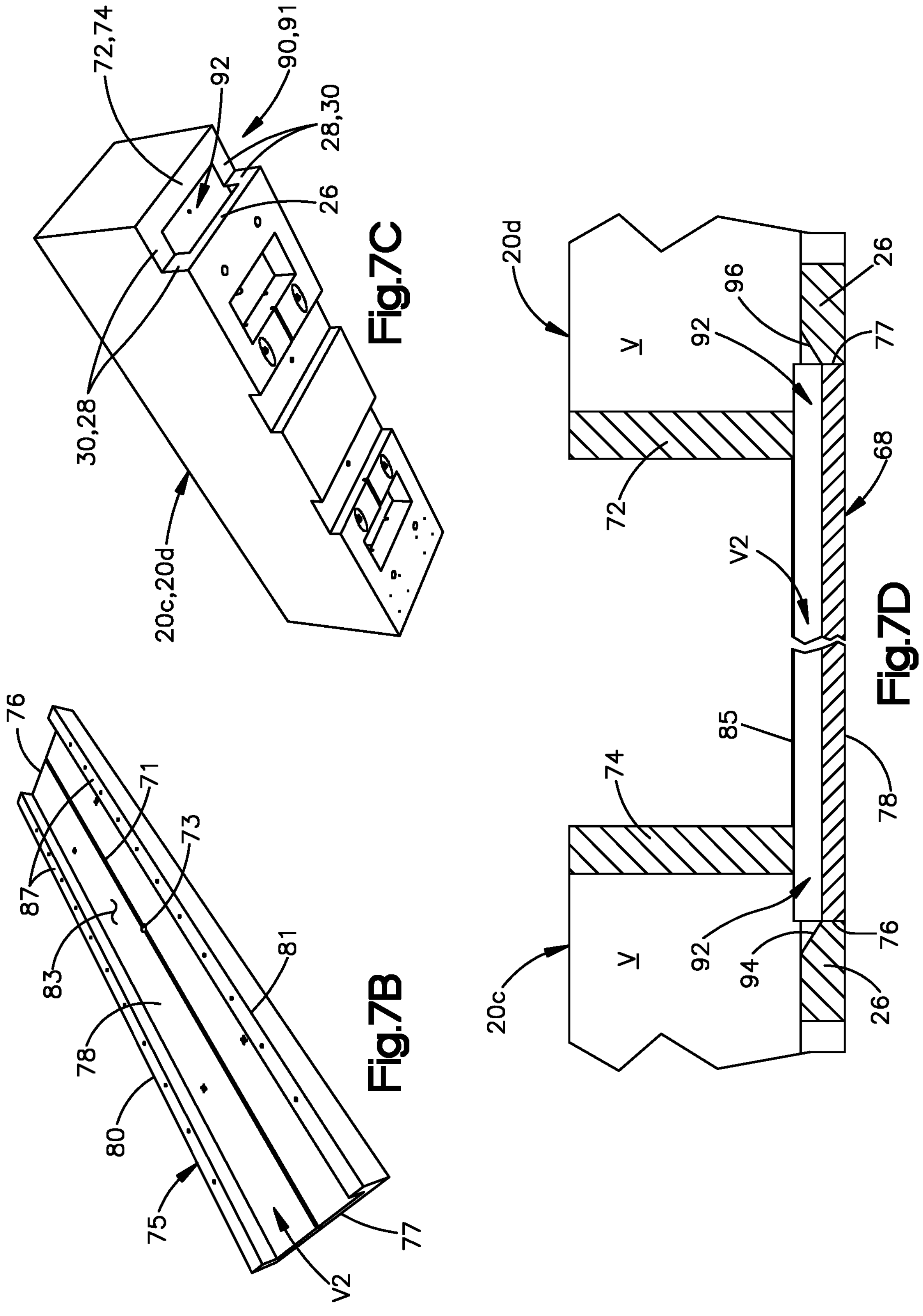
FIGS. 7B and 7C are perspective views of a bridge member (FIG. 7B) and an end-type housing body variant (FIG. 7C) of the bridge assembly illustrated in FIG. 7A.
FIG. 7D is sectional side view of a portion of the connected bridge assembly illustrated in FIG. 7A.

Similar to the housing bodies 20, 20*a*, 20*b* described above, the bridge housing body 75 preferably comprises concrete, which facilitates efficient, cost-effective, and scalable prefabrication. Preferably, the concrete consists of CarbonCure Concrete mix, although in other embodiments, the bridge housing body 75 can include other concrete mixes and constituent materials. The walkway bridge 68 includes a bridge cover 85 (FIG. 7A) configured to connect to an upper portion of the bridge housing body 75, such as to upper ends 87 of the sidewalls 80, 81 (FIG. 7B). In this manner, the bridge cover 85 at least substantially encloses the interior passage V2 along the lateral and vertical directions Y, Z.

The pair of adapter-type housing bodies 20*c*, 20*d* are configured to mate with the first and second ends 76, 77 of the walkway bridge 68. It should be appreciated that the adapter-type housing bodies 20*c*, 20*d* are configured similarly to the end-type housing bodies 20*a*, 20*b* discussed above with reference to FIGS. 6A-6B. For example, the first or second end 22, 24 of the adapter-type housing bodies 20*c*, 20*d* are preferably enclosed or capped by a respective first or second end member 72, 74. In the present embodiment, however, the adapter-type housing bodies 20*c*, 20*d* include respective mating formations 90 for connecting with the ends 76, 77 of the walkway bridge 68. For example, the mating formations 90 can each include a receptacle 91 at the respective end 22, 24 thereof. The receptacles 91 have a geometry configured to receive, in complimentary fashion, the respective end 76, 77 of the bridge body 75.

It should be appreciated that, in other embodiments, the bridge 68 can be configured to accommodate vehicle traffic in addition to foot traffic.

Referring now to FIG. 7C, an adapter-type housing body is shown that, for illustrative purposes, represents both the proximal and distal housing bodies 20*c*, 20*d*). The receptacle 91 is defined by portions of the end member 72, 74, base 26, and sidewalls 28, 30, which collectively define an opening 92 that is open to the respective first or second end 76, 77 of the walkway bridge 68. Additionally, as shown FIG. 7D, the bases 26 of the adapter-type housing bodies 20*c*, 20*d* preferably include descending and ascending lead-in surfaces 94, 96 that extend to and from, respectively, the receptacle openings 92 for facilitating passage of conduit or other components through the openings 92 and to the interior passage V2 of the walkway bridge 68.

In additional embodiments, the charging units 2 are configured to connect with or otherwise accommodate additional and/or alternative components of the EV charging system 100, such as existing infrastructure of the charging area (e.g., parking lot), as will now be described.

Figures 8A, 8B:
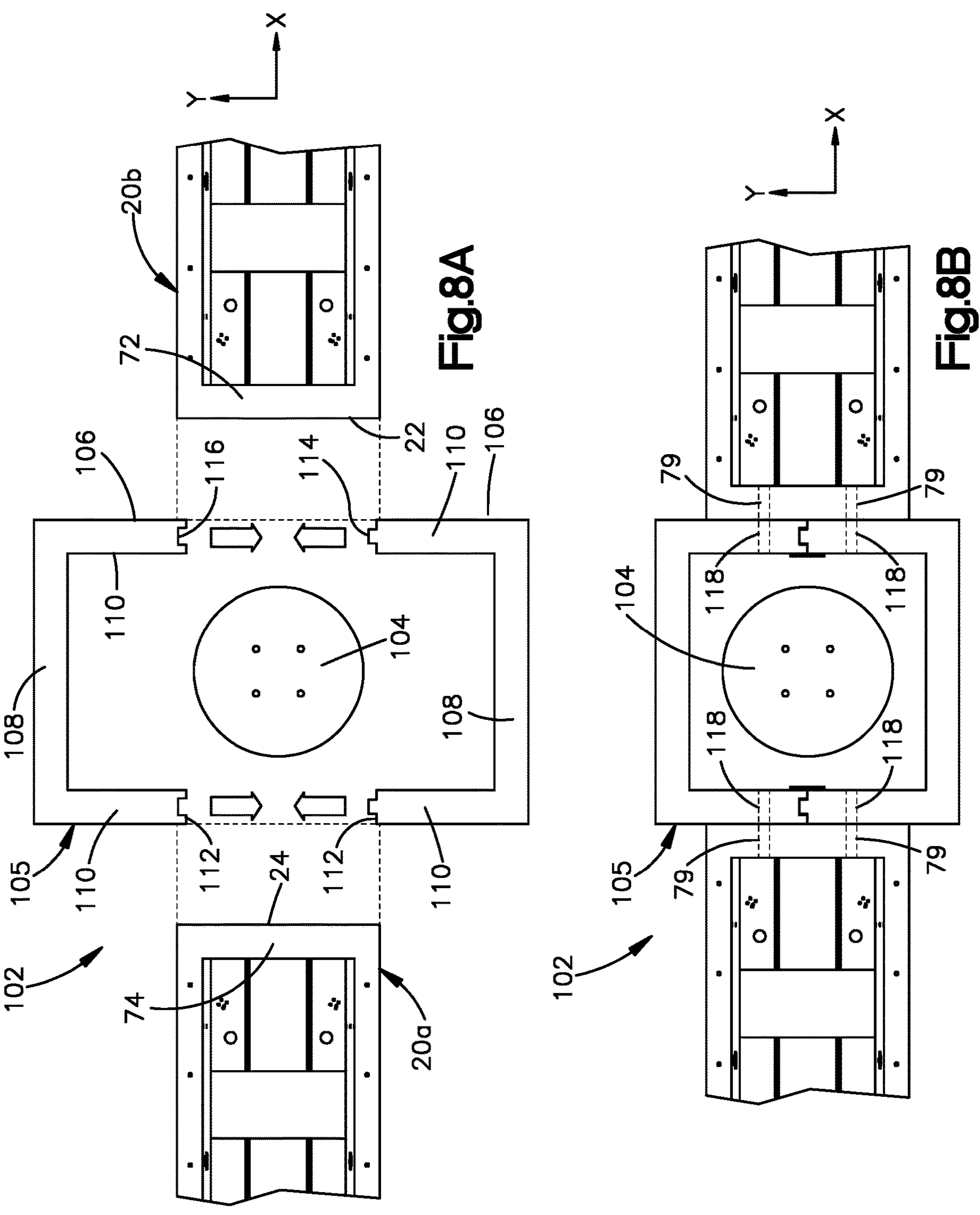
FIGS. 8A and 8B are to plan views of a fixture accommodation assembly of an EV charging system in an intermediate phase (FIG. 8A) and a connected phase (FIG. 8B) of assembly.

Referring now to FIGS. 8A-8B, an example embodiment of a fixture accommodation unit 102 is shown for use in the EV charging system 100. In this example, the fixture-accommodation unit 102 is a light-pole unit 102 configured to house or otherwise enclose an existing light-pole fixture 104 of a parking lot. As shown, the light-pole unit 102 is connectable between a pair of end-type housing bodies 20*a*, 20*b*, thereby allowing the charging unit series 2*a*, 2*b* (and its power distribution) to bridge or span the light-pole fixture 104. In other embodiments, the light-pole unit 102 can be connected to a single end-type housing body 20*a*, 20*b* so as to be an end-piece of a charging unit series 2*a*, 2*b*.

The light-pole unit 102 includes a housing body 105 having a pair of housing members 106 opposite each other along the lateral direction Y. The housing members 106 each have a sidewall 108 extending longitudinally between a pair of endwalls 110 that are longitudinally spaced from each other. Each housing member 106 has an open side laterally opposite the sidewall 108. In this manner, the housing members 106 can be assembled around the light pole fixture 104 by placing the housing members 106 laterally astride the light-pole fixture 104, in bracket-like fashion, and moving the housing members 106 toward each other, such that ends 112 of the sidewalls 108 of the housing members 106 connect with each other. The sidewall ends 112 preferably include complimentary mating formations 114, 116, such as male and female mating formations 114, 116, as shown. It should be appreciated that other types of sidewall mating formations are within the scope of the present disclosure.

As mentioned above, the light-pole unit 102 is connectable to the end(s) of one or more charging units 2. As shown, the light-pole unit 102 can be connected between ends 24, 22 of a pair of charging unit housing bodies. In this example, the charging units 2 preferably have complimentary end-type housing bodies 20*a*, 20*b*, respectively, such that the enclosed ends 24, 22 thereof abut the sidewalls 108 of the light-pole housing members 106. Additionally, in this example, the end members 74, 72 of the housing bodies 20*a*, 20*b* define apertures 79 that interface with apertures 118 defined in the sidewalls 108 of the light-pole housing members 106. The interfacing apertures 79, 118 allow conduit, such as feeder cables 10, to exit the interior volume V of the upstream housing body 20*a*, enter the interior of the light-pole unit 102 through one mated pair of sidewalls 106, exit the light-pole unit 102 through the other mated pair of sidewalls 106, and enter the interior volume V of the downstream housing body 20*b*. In this manner, the light-pole unit 102 is configured to house and protect conduit extending therethrough and around the light-pole fixture 104 without interruption in the series of charging units 2*a*, 2*b*.

Although the illustrated embodiment shows the fixture accommodation unit 102 being a light-pole unit 102 for accommodating a light-pole fixture 104, it should be appreciated that various other types of fixture accommodation units 102 can be employed to bridge, span, or otherwise accommodate numerous other types of fixtures along the charging unit series 2*a*, 2*b* without interrupting the power distribution (e.g., conduit, such as feeder cables 10) thereof.

It should be appreciated that any of the charging units 2 and housing bodies 20, 20*a*, 20*b*, 20*c*, 20*d*, 75, 105 described above can be further and/or alternatively adapted for specific types of use and/or for specific structural requirements of a charging area.

For example, in additional embodiments, the charging units 2 described above can be configured for use with user-carried interchangeable charge cables, which can be similar to the charge cables 12 described above, but are carried by individual EV drivers and are connectable to the respective chargers 4 during use charging an EV. In such embodiments, the charging unit 2 can include a unit charge port for docking with a base end of the user-carried charge cable opposite the charge head of the cable. The unit charge port electrically couples the user-carried charge cable with a charger 4, such that, when the charge head of the user-carried charge cable is docked with the charge port of the EV, the charger 4 can charge the batteries of the EV. In such embodiments, the unit charge port(s) can be located along the cover, such as in place of the receptacles 64 shown in FIGS. 5B and 5C, or along the sidewalls or within recessed compartments in the cover and/or sidewalls. Such additional embodiments represent non-limiting examples of adaptations to the charging units 2 that fall within the scope of the present disclosure.

It should be appreciated that the types and variants of the housing bodies 20, 20*a*, 20*b*, 20*c*, 20*d*, 75, 105 described above demonstrate the versatility of the embodiments herein at adapting an EV charging system 100 to the various power distribution needs and infrastructure needs of a charging area.

It should further be appreciated when a numerical preposition (e.g., "first", "second", "third") is used herein with reference to an element, component, dimension, or a feature thereof (e.g., "first" and "second" sidewalls), such numerical preposition is used to distinguish said element, component, dimension, and/or feature from another such element, component, dimension and/or feature, and is not to be limited to the specific numerical preposition used in that instance. For example, a "first" sidewall, charger, or cable can also be referred to as a "second" sidewall, charger, or cable in a different context without departing from the scope of the present disclosure, so long as said elements, components, dimensions and/or features remain properly distinguished in the context in which the numerical prepositions are used.

Although the disclosure has been described in detail, it should be understood that various changes, substitutions, and alterations can be made herein without departing from the spirit and scope of the invention as defined by the appended claims. Moreover, the scope of the present disclosure is not intended to be limited to the particular embodiments described in the specification. In particular, one or more of the features from the foregoing embodiments can be employed in other embodiments herein. As one of ordinary skill in the art will readily appreciate from that processes, machines, manufacture, composition of matter, means, methods, or steps, presently existing or later to be developed that perform substantially the same function or achieve substantially the same result as the corresponding embodiments described herein may be utilized according to the present disclosure.

What is claimed:

1. A protective charging station for electric vehicles, comprising:

a housing body elongate along a longitudinal direction, the housing body comprising concrete and including a base extending between a first sidewall and a second sidewall opposite each other along a lateral direction perpendicular to the longitudinal direction, the base configured to sit atop a parking surface, the housing body defining an internal volume that extends upward from the base and laterally between the first and second sidewalls;

a cover opposite the base along a vertical direction that is perpendicular to the longitudinal and lateral directions;

a charger connected to the housing body;

at least one charge cable extending from the charger to a charge head that is configured to dock with a charge port of an electric vehicle, wherein the at least one charge cable is iteratable between a neutral configuration, in which at least a majority of the at least one charge cable is disposed underneath the cover and within the internal volume, and an active configuration, in which a portion of the at least the majority of charge cable extends outside the internal volume; and a feeder cable that extends along the internal volume and is in electrical communication with the charger, wherein the feeder cable is configured to supply power from a power source to the charger.

2. The protective charging station of claim 1, further comprising one or more additional feeder cables that extend through the internal volume from a first end of the housing body to a second end of the housing body, wherein the one or more additional feeder cables are configured to supply power to one or more respective chargers downstream of the protective charging station.

3. The protective charging station of claim 2, further comprising:

a first set of racks mounted to a first interior surface of the first sidewall; and a second set of racks mounted to a second interior surface of the second sidewall, wherein the one or more additional feeder cables are carried on one or more respective ones of the first and second sets of racks.

4. The protective charging station of claim 3, further comprising first and second dividers within the internal volume that each extend along the longitudinal direction and substantially along the vertical direction, the first and second dividers being located between the first set of racks and the second set of racks along the lateral direction, the first and second dividers defining a compartment between each other along the lateral direction, wherein the at least the majority of the charge cable is disposed in the compartment when in the neutral configuration.

5. The protective charging station of claim 4, wherein the cover comprises:

at least one holster configured to support the charge head when the at least one charge cable is in the neutral configuration;

at least one port through which the at least one charge cable extends; and at least one access panel adjacent the at least one port, wherein the at least one access panel is iteratable between a closed position and an open position, such that when the at least one access panel is in the open position the at least the majority of the at least one charge cable is accessible to a user.

6. The protective charging station of claim 1, wherein the cover comprises a top surface, and the charger has a mount portion that is recessed from the top surface along the vertical direction.

7. The protective charging station of claim 6, wherein a portion of the charger extends upward from the top surface of the cover, and the cover further comprises a charger access panel adjacent the charger, wherein the charger access panel is iteratable between a closed position and an open position, such that when the charger access panel is in the open position the mount portion of the charger is accessible to a user.

8. The protective charging station of claim 1, wherein the housing body has a first end and a second end opposite each other along the longitudinal direction, the first and second sidewalls each having an upper portion configured to mount with the cover for substantially enclosing the internal volume along the vertical direction, the housing body including a conduit support structure located within the internal volume and configured to support the feeder cable and a plurality of additional feeder cables, wherein the feeder cable and the plurality of additional feeder cables extend from the first end to the second end of the housing body.

9. The protective charging station of claim 8, wherein the housing body comprises concrete, each of the first and second sidewalls has a thickness of at least 4 inches, and the housing body has sufficient strength to satisfy P1/S10, P2/S20, and P3/S30 ratings according to ASTM F3016-19.

10. The protective charging station of claim 8, wherein the conduit support structure comprises a plurality of racks extending from at least one of first and second interior surfaces of the first and second sidewalls, respectively, each of the plurality of racks configured to support one or more of the plurality of feeder cables.

11. The protective charging station of claim 10, wherein:

the plurality of racks comprise a first set of racks mounted to the first interior surface and a second set of racks mounted to the second interior surface; and the housing further comprises first and second dividers within the internal volume that each extend along the longitudinal direction and substantially along the vertical direction, the first and second dividers being located between the first and second sets of racks along the lateral direction, the first and second dividers defining a compartment therebetween for housing one or more charge cables.

12. The protective charging station of claim 8, wherein the base defines at least one opening that is open to an exterior of the housing body, the at least one opening configured for providing on or more of: underground access to the interior volume; drainage; and a pick point for connection to an apparatus for moving the housing.

13. The protective charging station of claim 8, wherein the first end has a first mating structure, the second end has a second mating structure configured to mate with the first mating structure such that a plurality of housing bodies each having the first and second mating structures are interconnectable with each other first end to second end.

14. The protective charging station of claim 8, wherein the base comprising a first pair of openings adjacent the first end and a second pair of openings adjacent the second end, wherein the first and second pairs of openings are configured to receive respective portions of leveling inserts that are individually adjustable for leveling the base.

15. A system for charging electric vehicles, comprising:

a plurality of the protective charging stations of claim 1, wherein the plurality of protective charging stations are interconnected with each other and are in electrical communication with the power source.

16. The system of claim 15, wherein a majority of the plurality of protective charging stations each comprise a plurality of additional feeder cables extending along the internal volume and in electrical communication with the charger of the respective protective charging station, wherein the additional feeder cables are configured to supply power from the power source to the chargers of others of the protective charging stations, such that each charger is supplied power by a respective one of the feeder cables, such that the feeder cable and the plurality of additional feeder cables are connected in parallel.

17. The system of claim 15, wherein, each cover includes at least one holster for seating the at least one charge head, and wherein, in at least a majority of the plurality of protective charging stations, the at least one charge cable comprises first and second charge cables, the at least one charge head comprises first and second charge heads, and the at least one holster comprises first and second holsters.

18. The system of claim 15, wherein at least some of the plurality of protective charging stations are disposed between opposed inner ends of a pair of parking stalls spaced from each other along the lateral direction.

19. The system of claim 15, further comprising at least one bridge unit extending between a pair of protective charging stations of the plurality of protective charging stations, the at least one bridge unit having a bridge body that defines an internal bridge volume that extends along the vertical direction between a bridge top portion and a bridge bottom portion, wherein the top bridge portion is recessed along the vertical direction with respect to the covers of the pair of protective charging stations, such that the bridge body is configured to allow one or more of foot traffic and vehicle traffic over the bridge top portion.

20. The system of claim 15, further comprising a fixture housing unit extending between a pair of protective charging stations of the plurality of protective charging stations, the fixture housing unit comprising a pair of housing members positioned opposite each other along the lateral direction, thereby bracketing an interior space between sidewalls of the pair of housing members, wherein the interior space is configured to contain at least a portion of a fixture mounted to the parking surface.

* * * * *